United States Patent
Kondo et al.

(10) Patent No.: US 11,208,114 B2
(45) Date of Patent: Dec. 28, 2021

(54) SENSOR CONTROL APPARATUS

(71) Applicant: DENSO CORPORATION, Kariya (JP)

(72) Inventors: Katsuhiko Kondo, Nisshin (JP);
Yusuke Akamine, Nisshin (JP);
Yasuyuki Miyake, Kariya (JP)

(73) Assignee: DENSO CORPORATION, Kariya (JP)

( * ) Notice: Subject to any disclaimer, the term of this patent is extended or adjusted under 35 U.S.C. 154(b) by 241 days.

(21) Appl. No.: 16/343,129

(22) PCT Filed: Oct. 16, 2017

(86) PCT No.: PCT/JP2017/037404
§ 371 (c)(1),
(2) Date: Apr. 18, 2019

(87) PCT Pub. No.: WO2018/074426
PCT Pub. Date: Apr. 26, 2018

(65) Prior Publication Data
US 2019/0315373 A1 Oct. 17, 2019

(30) Foreign Application Priority Data
Oct. 21, 2016 (JP) .............................. JP2016-206888

(51) Int. Cl.
*B60W 50/06* (2006.01)
*B62D 15/02* (2006.01)
(Continued)

(52) U.S. Cl.
CPC ............ *B60W 50/06* (2013.01); *B62D 15/021* (2013.01); *G07C 5/02* (2013.01); *G07C 5/08* (2013.01);
(Continued)

(58) Field of Classification Search
CPC .......... B60W 50/06; B60W 2050/065; B60W 2420/00; B60W 2420/42; B60W 2420/52;
(Continued)

(56) References Cited

U.S. PATENT DOCUMENTS

| 2012/0065841 A1* | 3/2012 | Nagata | ............... G08G 1/166 |
| | | | 701/36 |
| 2016/0231746 A1* | 8/2016 | Hazelton | ............... G01S 13/867 |
| 2017/0113664 A1* | 4/2017 | Nix | ............... B60T 7/12 |

FOREIGN PATENT DOCUMENTS

| JP | 5-238314 A | 9/1993 |
| JP | 2008-152390 A | 7/2008 |

(Continued)

*Primary Examiner* — Ig T An
(74) *Attorney, Agent, or Firm* — Maschoff Brennan

(57) ABSTRACT

An executing unit is configured to execute at least one of control of operating performance of a plurality of sensors which monitor different regions around a vehicle and predetermined processing for each of a plurality of output values output from the plurality of sensors. A specifying unit is configured to specify a direction of the vehicle with respect to a reference direction set on the basis of a road around the vehicle. A setting unit is configured to set priorities of the plurality of sensors in accordance with the direction of the vehicle specified by the specifying unit. The executing unit changes at least one of ratios of the operating performance of the plurality of sensors and ratios of amounts of processing performed for the plurality of output values on the basis of the priorities.

8 Claims, 10 Drawing Sheets

(51) Int. Cl.
*G07C 5/02* (2006.01)
*G07C 5/08* (2006.01)

(52) U.S. Cl.
CPC ... *B60W 2050/065* (2013.01); *B60W 2420/00* (2013.01); *B60W 2420/42* (2013.01); *B60W 2420/52* (2013.01); *B60W 2510/20* (2013.01); *B60W 2520/00* (2013.01); *B60W 2520/06* (2013.01); *B60W 2520/10* (2013.01)

(58) Field of Classification Search
CPC ......... B60W 2510/20; B60W 2520/00; B60W 2520/06; B60W 2520/10; B62D 15/021; G07C 5/02; G07C 5/08
See application file for complete search history.

(56) References Cited

FOREIGN PATENT DOCUMENTS

| JP | 2008152390 | * | 7/2008 | ............. B60R 19/48 |
|----|------------|---|--------|---------------------------|
| JP | 2008-256620 A | | 10/2008 | |
| JP | 2012-45984 A | | 3/2012 | |
| JP | 5327321 B2 | | 10/2013 | |
| WO | 2010140239 A1 | | 12/2010 | |

* cited by examiner

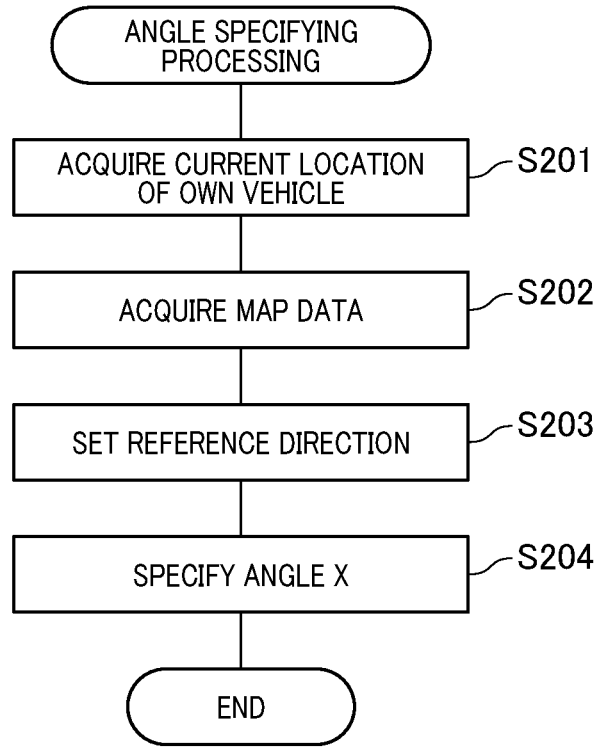
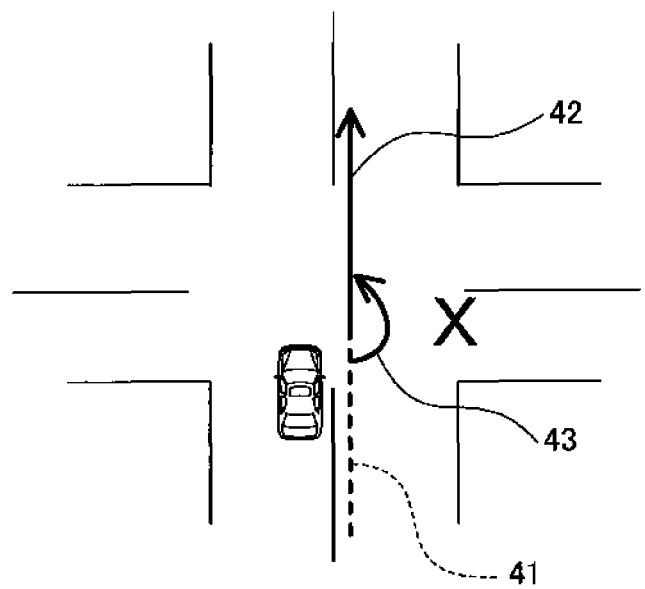

SENSOR CONTROL APPARATUS

CROSS-REFERENCE TO RELATED APPLICATION

The present application is a national stage application of PCT Application No. PCT/JP2017/037404, filed on Oct. 16, 2017, which claims the benefit of priority from earlier Japanese Patent Application No. 2016-206888 filed on Oct. 21, 2016, the entire content of which is incorporated herein by reference. Also, any applications for which a foreign or domestic priority claim is identified in the Application Data Sheet as filed with the present application are hereby incorporated by reference under 37 CFR 1.57.

TECHNICAL FIELD

The present disclosure relates to a sensor control apparatus.

BACKGROUND ART

PTL 1 discloses a sensor control apparatus which controls detection accuracy of a plurality of sensors which monitor different regions around a vehicle and processing periods for a plurality of output values output from the above-described plurality of sensors.

At this sensor control apparatus, the priorities of the plurality of sensors are set for the purpose of reducing load of a CPU and an in-vehicle LAN. The priority is set on the basis of a traveling direction of the vehicle. That is, first, the traveling direction of the vehicle is determined on the basis of movement of the vehicle and a line of sight of a driver. Then, in the case where a result of the determination indicates that the traveling direction of the vehicle is a right direction, priority of a sensor which monitors a region on the right side of the vehicle is increased. Meanwhile, in the case where the result of the determination indicates that the traveling direction of the vehicle is a left direction, priority of a sensor which monitors a region on the left side of the vehicle is increased. Then, sensor detection accuracy is changed to be higher for a sensor with higher priority. Further, the processing period for the output value of the sensor is changed to be a shorter as the priority is higher.

CITATION LIST

Patent Literature

[PTL 1] JP 5327321 B

SUMMARY OF THE INVENTION

However, the inventor has found the following problems as a result of detailed review. That is, in the case where a vehicle changes a traveling direction and makes a turn, there is a case where a mobile body has to be detected with a sensor which monitors a region on the opposite side of the traveling direction. Specifically, for example, in the case where the vehicle makes a turn at the intersection, it is necessary to detect an oncoming vehicle which approaches the vehicle. With the configuration of PTL 1, the priority of the sensor which monitors a region on the traveling direction side of the vehicle tends to be higher. Therefore, there is a case where detection of a mobile body by the sensor which monitors the region on the opposite side of the traveling direction of the vehicle is delayed. That is, with the configuration of PTL 1, there is a case where detection of the mobile body is delayed by the priority being inappropriately set.

One aspect of the present disclosure is to suppress occurrence of delay of detection of a mobile body by priorities of sensors being inappropriately set.

One aspect of the present disclosure is a sensor control apparatus including an executing unit, a specifying unit and a setting unit. The executing unit is configured to execute at least one of control of operating performance of a plurality of sensors which monitor different regions around a vehicle, and predetermined processing for each of a plurality of output values output from the plurality of sensors. The specifying unit is configured to specify a direction of the vehicle with respect to a reference direction set on the basis of a road around the vehicle. The setting unit is configured to set priorities of the plurality of sensors in accordance with the direction of the vehicle specified by the specifying unit. The executing unit changes at least one of ratios of the operating performance of the plurality of sensors and ratios of amounts of processing performed for the plurality of output values on the basis of the priorities.

According to such a configuration, it is possible to change the priority in accordance with the direction of the vehicle with respect to the reference direction. Therefore, it is possible to appropriately set the priority in accordance with the direction of the vehicle with respect to the reference direction. That is, for example, in the case where the vehicle makes a turn, it is possible to appropriately set the priority. It is therefore possible to suppress occurrence of delay of detection of a mobile body by the priorities of the sensors being inappropriately set.

Note that reference numerals in parentheses recited in the claims indicate correspondence relationship with specific means described in embodiments which will be described later as one aspect, and do not limit the technical scope of the present disclosure.

BRIEF DESCRIPTION OF DRAWINGS

FIG. 4 is a flowchart of angle specifying processing of a first embodiment.

FIG. 5 is a diagram illustrating a situation immediately after the vehicle enters the intersection upon a right turn.

DESCRIPTION OF EMBODIMENTS

Embodiments of the present disclosure will be described below with reference to the drawings.

1. First Embodiment

1-1. Configuration

Figure 1:
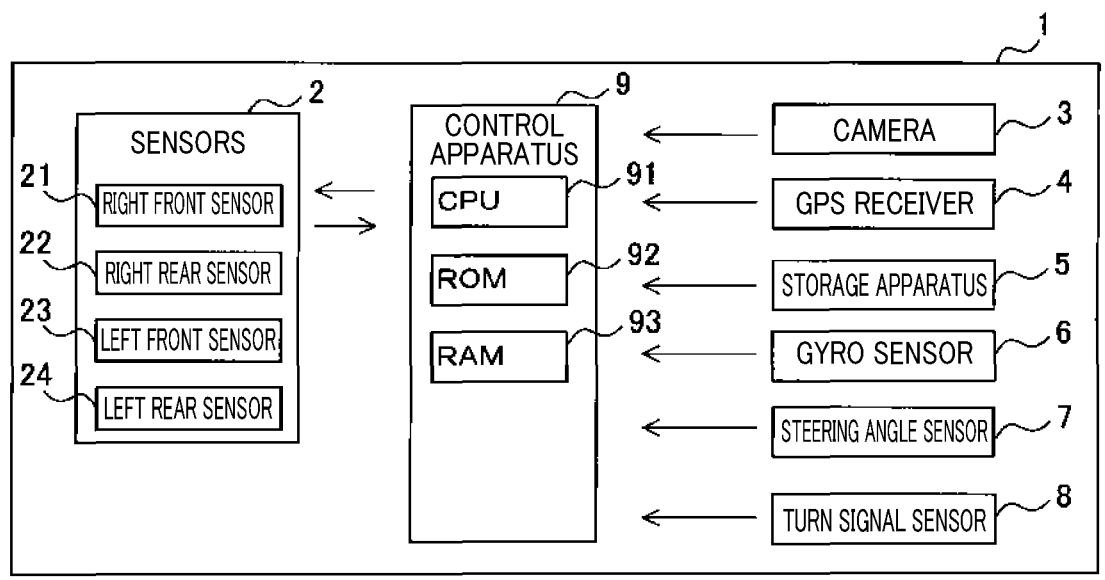
FIG. 1 is a block diagram illustrating a configuration of a sensor control system.

A control system 1 illustrated in FIG. 1 is mounted on a vehicle. The sensor control system 1 includes sensors 2, a camera 3, a GPS receiver 4, a storage apparatus 5, a gyro sensor 6, a steering angle sensor 7, a turn signal sensor 8 and a control apparatus 9. In the following description, a vehicle on which the sensor control system 1 is mounted will be referred to as an "own vehicle".

The sensors 2 include a right front sensor 21, a right rear sensor 22, a left front sensor 23 and a left rear sensor 24. In the present embodiment, the sensors 21 to 24 are millimeter-wave radars. The sensors 21 to 24 radiate radar waves in a millimeter-wave band within predetermined regions around the own vehicle, and detect a size, a relative position with respect to the own vehicle, relative speed, or the like, of an object existing around the own vehicle by receiving reflected waves thereof.

Figure 2:
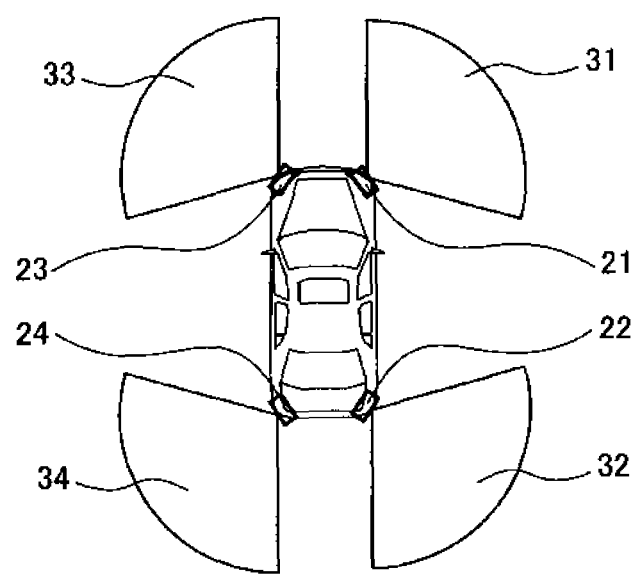
FIG. 2 is a diagram illustrating a position where a sensor is mounted in a vehicle and a region to be monitored by the sensor.

As illustrated in FIG. 2, the right front sensor 21 is provided at a right front portion of the own vehicle and monitors a region 31 on a right front side of the own vehicle. The right rear sensor 22 is provided at a right rear portion of the own vehicle and monitors a region 32 on a right rear side of the own vehicle. The left front sensor 23 is provided at a left front portion of the own vehicle and monitors a region 33 on a left front side of the own vehicle. The left rear sensor 24 is provided at a left rear portion of the own vehicle and monitors a region 34 on a left rear side of the own vehicle. The sensors 21 to 24 output detection results to the control apparatus 9.

The camera 3 captures an image ahead of the own vehicle. The camera 3 outputs data expressing the captured image to the control apparatus 9.

The GPS receiver 4 specifies a current location of the own vehicle by receiving a transmission wave from a satellite for a GPS via a GPS antenna which is not illustrated. The GPS receiver 4 outputs the current location of the own vehicle to the control apparatus 9.

The storage apparatus 5 stores map data. In the present embodiment, the map data includes road information. The road information includes data of links and nodes of roads. Then, information of shapes of roads, lanes, intersections, pedestrian crossings, or the like, is associated with the links and the nodes of the roads.

The gyro sensor 6 is a sensor configured to detect rotation angular speed of the own vehicle. The gyro sensor 6 outputs a detection result to the control apparatus 9.

The steering angle sensor 7 is a sensor configured to detect a steering angle of the own vehicle. The steering angle sensor 7 outputs a detection result to the control apparatus 9.

The turn signal sensor 8 is a sensor configured to detect an operation state of a turn signal lever of the own vehicle. In the following description, the operation state of the turn signal lever which indicates a right direction will be referred to as a "right indicated state". Further, the operation state of the turn signal lever which indicates a left direction will be referred to as a "left indicated state". Still further, the operation state of the turn signal lever which indicates neither the right direction nor the left direction will be referred to as a "straight indicated state". The turn signal sensor 8 outputs a detection result to the control apparatus 9.

The control apparatus 9 includes a microcomputer including a CPU 91, a ROM 92, a RAM 93, or the like, as components. The CPU 91 executes a program stored in a non-transitory computer-readable storage medium such as the ROM 92. By this program being executed, a method corresponding to the program is executed.

In the present embodiment, the control apparatus 9 executes detection processing of detecting obstacles such as pedestrians and other vehicles on output values output from the sensors 2. Then, the control apparatus 9 executes collision avoidance control of avoiding collision in the case where these obstacles are detected.

Further, the control apparatus 9 executes sensor control processing illustrated in FIG. 3 and FIG. 4 which will be described later. In this sensor control processing, priority of the respective sensors 21 to 24 is set. Then, ratios of processing amounts of detection processing to be performed on the output values output from the respective sensors 21 to 24 are changed on the basis of the set priority.

1-2. Processing

The sensor control processing to be executed by the control apparatus 9 will be described next using FIG. 3 and FIG. 4. The sensor control processing is started by an ignition switch of the own vehicle being turned on.

In S101, the control apparatus 9 resets the priorities of all the sensors 21 to 24 to initial values. In the present embodiment, the initial values are 1.

In S102, the control apparatus 9 specifies a predicted traveling direction which is a traveling direction of the own vehicle at a predetermined time point later than a current time point. The predetermined time point later than the current time point described here is set so as to be a time point in the process of the own vehicle making a turn at the intersection, in the case where the own vehicle is located before the intersection at the current time point.

In S102, the control apparatus 9 specifies the predicted traveling direction on the basis of the detection result of the turn signal sensor 8. Specifically, in the case where the operation state of the turn signal lever is the straight indicated state upon execution of S102, it is specified that the predicted traveling direction is a straight direction. Further, in the case where the operation state of the turn signal lever is the right indicated state upon execution of S102, it is specified that the predicted traveling direction is a right direction. Further, in the case where the operation state of the turn signal lever is the left indicated state upon execution of S102, it is specified that the predicted traveling direction is a left direction.

In S103, the control apparatus 9 determines which of the straight direction, the left direction and the right direction the predicted traveling direction is. In the case where the control apparatus 9 determines that the predicted traveling direction is the straight direction, the processing proceeds to S106 which will be described later. Meanwhile, in the case where the control apparatus 9 determines that the predicted traveling direction is the right direction, the processing proceeds to S104.

In S104, the control apparatus 9 adds 1 to the priorities of both the right front sensor 21 and the right rear sensor 22 which monitor the regions on the right side of the own vehicle. After the control apparatus 9 executes S104, the processing proceeds to S106 which will be described later.

Meanwhile, in the case where the control apparatus 9 determines in S103 described above that the predicted traveling direction is the left direction, the processing proceeds to S105.

In S105, the control apparatus 9 adds 1 to the priorities of both the left front sensor 23 and the left rear sensor 24 which monitor the regions on the left side of the own vehicle. After the control apparatus 9 executes S105, the processing proceeds to S106.

In S106, the control apparatus 9 executes angle specifying processing. This angle specifying processing is processing of specifying an angle formed by the reference direction set on the basis of the road around the own vehicle and the direction of the own vehicle. As will be described later, in the present embodiment, a direction of an oncoming lane is set as the reference direction. The angle specifying processing will be specifically described below using the flowchart in FIG. 4.

In S201, the control apparatus 9 acquires the current location of the own vehicle from the GPS receiver 4.

In S202, the control apparatus 9 acquires map data from the storage apparatus 5.

In S203, the control apparatus 9 sets the reference direction on the basis of the location of the own vehicle and the map data. Specifically, first, an own lane which is a lane on which the own vehicle is traveling is specified on the basis of road information included in the map data and the current location of the own vehicle. Then, the direction of the oncoming lane with respect to the own lane, which is included in the map data, is set as the reference direction. Note that the oncoming lane described here, more generally, a direction of a certain lane means a direction in which the lane extends. In other words, the direction of the lane means a direction along section lines (such as, for example, a center line of the road) which define the lane.

Further, in the case where the oncoming lane is switched such as a case where the own vehicle turns left or right at the intersection, the direction of the oncoming lane on the road on which the own vehicle has traveled immediately before the own vehicle enters the intersection is set as the reference direction until a predetermined switching timing. Then, at the switching timing, a direction of the oncoming lane on the road on which the own vehicle travels immediately after the own vehicle leaves the intersection is set as the reference direction. In the present embodiment, the switching timing is a timing at which the predicted traveling direction is switched, and, specifically, a timing at which the operation state of the turn signal lever is switched from the right indicated state or the left indicated state to the straight indicated state.

In S204, the control apparatus 9 specifies an angle X formed by the reference direction and the direction of the own vehicle. Specifically, first, a current direction of the own vehicle is calculated on the basis of a detection result of the gyro sensor 6. Then, the angle X formed by the reference direction and the direction of the own vehicle is specified on the basis of the calculated direction of the own vehicle and the set reference direction.

Figure 6:
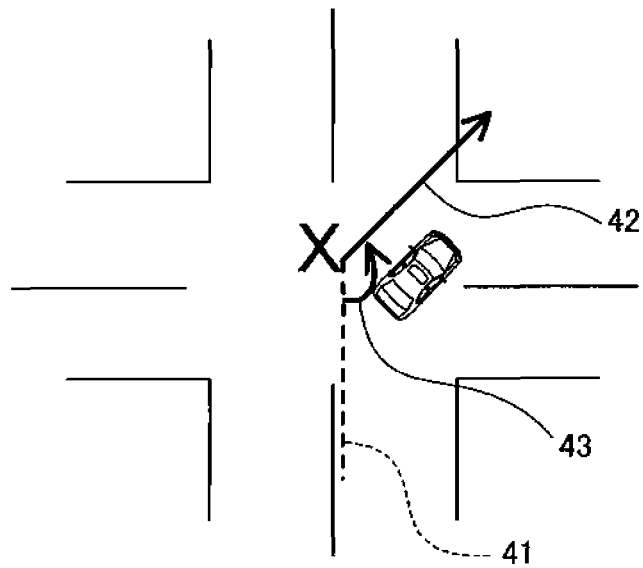
FIG. 6 is a diagram illustrating a situation where the vehicle turns right and a direction of the vehicle deviates to a right side with respect to a direction of an oncoming lane.
Figure 7:
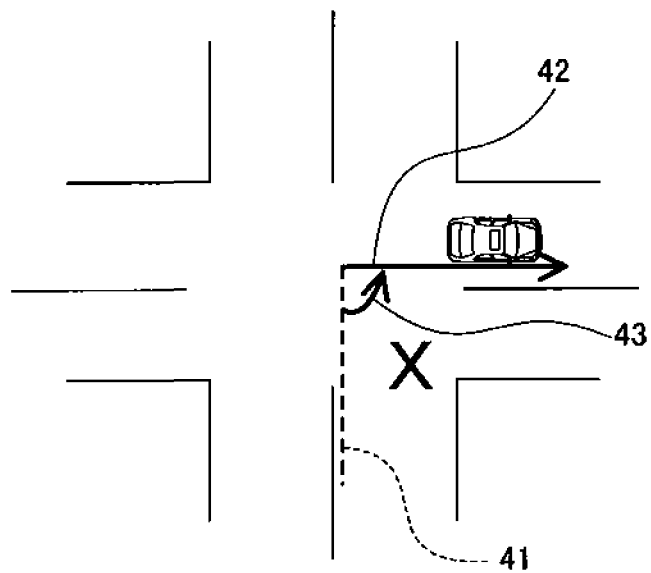
FIG. 7 is a diagram illustrating a situation where the vehicle completes a right turn and is leaving the intersection.
Figure 9:
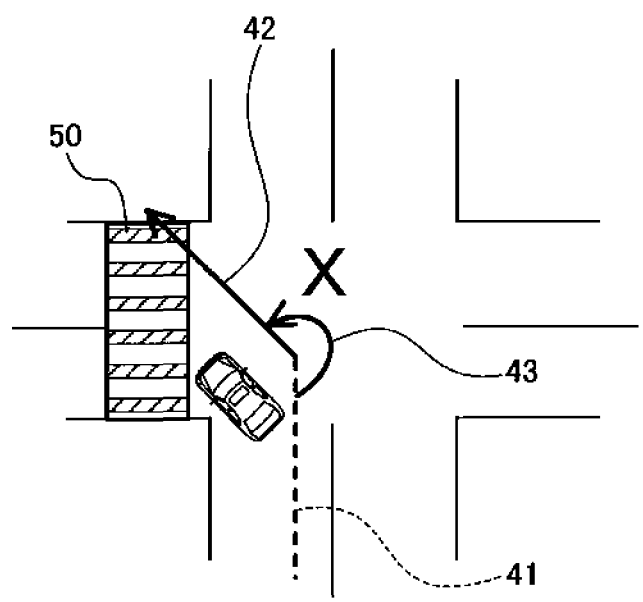
FIG. 9 is a diagram illustrating a situation where the vehicle turns left and the direction of the vehicle deviates to a left side with respect to the direction of the oncoming lane.
Figure 10:
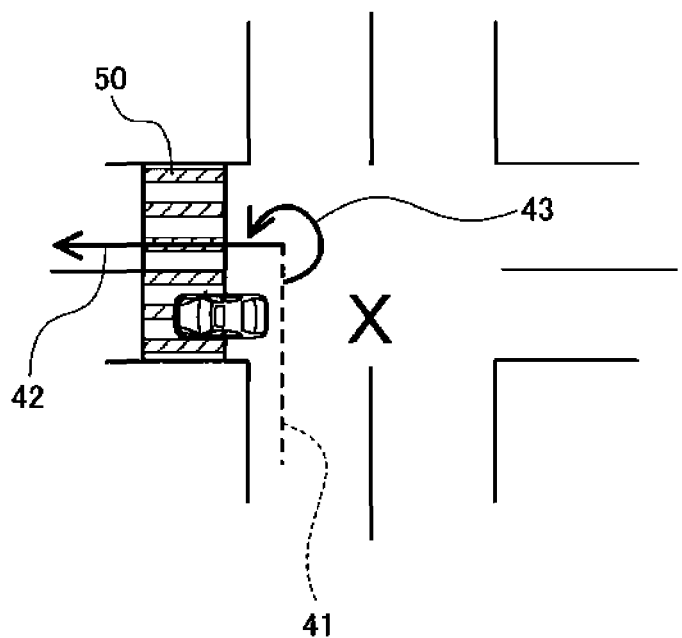
FIG. 10 is a diagram illustrating a situation where the vehicle completes a left turn and is leaving the intersection.

In the present embodiment, the angle X is 180 degrees in a state where the reference direction matches the direction of the own vehicle. Then, from this state, the angle X is set smaller as the direction of the own vehicle deviates (turns) to the right side with respect to the reference direction and sets larger as the direction of the own vehicle deviates to the left side. That is, a state where the direction of the own vehicle deviates (turns) to the right side with respect to the reference direction as illustrated in FIG. 6 and FIG. 7 corresponds to a state where the angle X is smaller than 180 degrees. Meanwhile, a state where the direction of the own vehicle deviates to the left side with respect to the reference direction as illustrated in FIG. 9 and FIG. 10 corresponds to a state where the angle X is larger than 180 degrees. Note that, in FIG. 5 to FIG. 10, a line 41 indicated with a dashed line indicates the direction of the oncoming lane set as the reference direction, and a straight arrow 42 indicated with a solid line indicates the direction of the own vehicle. Further, a curved arrow 43 indicated with a solid line indicates the angle X.

After the control apparatus 9 executes S204, the control apparatus 9 finishes the angle specifying processing. Then, after the control apparatus 9 finishes the angle specifying processing, the processing proceeds to S107 in FIG. 3.

In S107, the control apparatus 9 determines whether the specified angle X is equal to or smaller than 180 degrees or larger than 180 degrees. In the case where the control apparatus 9 determines that the angle X is equal to or smaller than 180 degrees, the processing proceeds to S108.

In S108, the control apparatus 9 adds a calculation result of $\{(180-X/90)\}$ to the priority of the left front sensor 23 which monitors the region on the left side of the own vehicle. After the control apparatus 9 executes S108, the processing proceeds to S110 which will be described later.

Meanwhile, in the case where the control apparatus 9 determines in S107 described above that the angle X is larger than 180 degrees, the processing proceeds to S109.

In S109, the control apparatus 9 adds a calculation result of $\{(X-180)/90\}$ to the priority of the right front sensor 21 which monitors the region on the right side of the own vehicle. After the control apparatus 9 executes S109, the processing proceeds to S110.

In S110, the control apparatus 9 executes control of the sensors 21 to 24 based on the priorities. In the present embodiment, the control apparatus 9 changes ratios of processing amounts in processing of detecting an obstacle on the basis of the priorities. The processing of detecting an obstacle is respectively executed on the plurality of output values output from the plurality of sensors 21 to 24. Specifically, the control apparatus 9 executes control similar to that disclosed in JP 5327321 B. That is, the control apparatus 9 changes the ratios of the processing amounts using the following method.

First, the control apparatus 9 calculates a total value A of the priorities of the sensors 21 to 24. For example, in the case where the priority of the right front sensor 21 is 2, the priority of the right rear sensor 22 is 2, the priority of the left front sensor 23 is 1, and the priority of the left rear sensor 24 is 1, the total value A of the priority is A=$\{6=(2+2+1+1)\}$.

Subsequently, the control apparatus 9 calculates B=$\{$(the number of bits allocated to processing of detecting an obstacle)/A$\}$. For example, if the number of bits allocated to the processing of detecting an obstacle is 24 bits per unit time, in the above-described example, because A=6, B=$\{4=(24/6)\}$.

Subsequently, the control apparatus 9 calculates C=$\{$(priority of respective sensors 21 to 24)×B$\}$. In the above-described example, C of the right front sensor 21 is 8=(2×4), C of the right rear sensor 22 is 8=(2×4), C of the left front sensor 23 is 4=(1×4), and C of the left rear sensor 24 is 4=(1×4).

Subsequently, the control apparatus 9 increases or decreases processing periods for the respective plurality of output values output from the respective sensors 21 to 24 in accordance with the number of bits of C of the respective sensors 21 to 24. Specifically, the control apparatus 9 increases or decreases the processing periods such that the processing period for the output value becomes shorter as C is greater. By the processing periods for the output values of the respective sensors 21 to 24 being changed on the basis of the priority in this manner, the processing amounts per unit time (throughputs) for the output values of the respective sensors 21 to 24 are changed.

In S111, the control apparatus 9 determines whether or not an ignition switch of the own vehicle is in an OFF state. In the case where the control apparatus 9 determines that the ignition switch of the own vehicle is in an OFF state, the control apparatus 9 finishes the sensor control processing. Meanwhile, in the case where the control apparatus 9 determines that the ignition switch of the own vehicle is not in an OFF state, that is, in an ON state, the processing proceeds to S101 described above, and the control apparatus 9 executes the processing after S101 again.

1-3. Specific Examples

How the priority of the respective sensors 21 to 24 is set as a result of the above-described sensor control processing will be described next using specific examples illustrated in FIG. 5 to FIG. 10.

1-3-1. Upon Right Turn

First, setting of the priority in the case where the own vehicle turns right at the intersection will be descried using FIG. 5 to FIG. 7.

FIG. 5 illustrates a situation immediately after the own vehicle enters the intersection to try to turn right at the intersection. In this situation, the operation state of the turn signal lever is the right indicated state. Therefore, it is determined in the determination in S103 described above that the predicted traveling direction is the right direction. As a result, in S104 described above, 1 is added to the priorities of both the right front sensor 21 and the right rear sensor 22. Meanwhile, because the angle X formed by the oncoming lane and the direction of the own vehicle is 180 degrees, it is determined in S107 described above that the angle X is equal to or smaller than 180 degrees. As a result, in S108 described above, a calculation result of {(180−180)/90=0} is added to the priority of the left front sensor 23 which monitors the region on the left side of the own vehicle. That is, addition of the priority is not performed at any sensor. Therefore, in the situation illustrated in FIG. 5, the priority of the right front sensor 21 is 2, the priority of the right rear sensor 22 is 2, the priority of the left front sensor 23 is 1, and the priority of the left rear sensor 24 is 1.

The subsequent FIG. 6 illustrates a situation where the own vehicle turns right, and the direction of the own vehicle deviates to the right side with respect to the direction of the oncoming lane. In this situation, the operation state of the turn signal lever is still the right indicated state. Therefore, in S104 described above, 1 is added to the priorities of both the right front sensor 21 and the right rear sensor 22. Meanwhile, because the angle X formed by the oncoming lane and the direction of the own vehicle is 135 degrees, in S108 described above, a calculation result of {(180-135)/90=1/2} is added to the priority of the left front sensor 23 which monitors the region on the left side of the own vehicle. Therefore, in the situation illustrated in FIG. 6, the priority of the right front sensor 21 is 2, the priority of the right rear sensor 22 is 2, the priority of the left front sensor 23 is 3/2, and the priority of the left rear sensor 24 is 1. Note that the priority of the left front sensor 23 is added in this manner in order to detect an oncoming vehicle which approaches from the left side of the own vehicle.

The subsequent FIG. 7 illustrates a situation where the own vehicle completes the right turn and is leaving the intersection. In this situation, the operation state of the turn signal lever is still the right indicated state. Therefore, in S104 described above, 1 is added to the priorities of both the right front sensor 21 and the right rear sensor 22. Meanwhile, because the angle X formed by the oncoming lane and the direction of the own vehicle is 90 degrees, in S108 described above, a calculation result of {(180-90)/90=1} is added to the priority of the left front sensor 23 which monitors the region on the left side of the own vehicle. Therefore, in the situation illustrated in FIG. 7, the priority of the right front sensor 21 is 2, the priority of the right rear sensor 22 is 2, the priority of the left front sensor 23 is 2, and the priority of the left rear sensor 24 is 1.

1-3-1. Upon Left Turn

Setting of the priority in the case where the own vehicle turns left at the intersection will be described next using FIG. 8 to FIG. 10.

Figure 8:
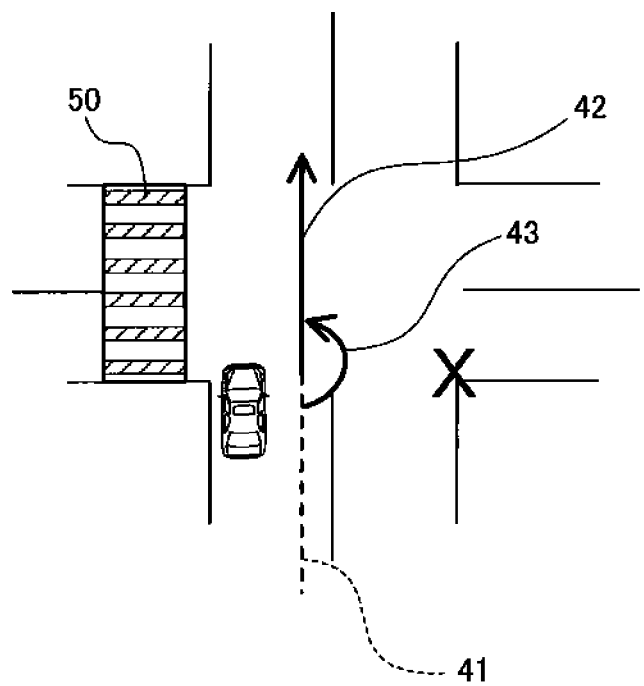
FIG. 8 is a diagram illustrating a situation immediately after the vehicle enters the intersection upon a left turn.

FIG. 8 illustrates a situation immediately after the own vehicle enters the intersection to try to turn left at the intersection. In this situation, the operation state of the turn signal lever is the left indicated state. Therefore, in the determination in S103 described above, it is determined that the predicted traveling direction is the left direction. As a result, in S105 described above, 1 is added to the priorities of both the left front sensor 23 and the left rear sensor 24. Meanwhile, because the angle X formed by the oncoming lane and the direction of the own vehicle is 180 degrees, it is determined in S107 described above that the angle X is equal to or smaller than 180 degrees. As a result, in S108 described above, a calculation result of {(180-180)/90=0} is added to the priority of the left front sensor 23 which monitors the region on the left side of the own vehicle. That is, addition of the priority is not performed at any sensor. Therefore, in the situation illustrated in FIG. 8, the priority of the right front sensor 21 is 1, the priority of the right rear sensor 22 is 1, the priority of the left front sensor 23 is 2, and the priority of the left rear sensor 24 is 2.

The subsequent FIG. 9 illustrates a situation where the own vehicle turns left, and the direction of the own vehicle deviates to the left side with respect to the direction of the oncoming lane. In this case, the operation state of the turn signal lever is still the left indicated state. Therefore, in S105 described above, 1 is added to the priorities of both the left front sensor 23 and the left rear sensor 24. Meanwhile, because the angle X formed by the oncoming lane and the direction of the own vehicle is 225 degrees, in S109 described above, a calculation result of {(225-180)/90=1/2} is added to the priority of the right front sensor 21 which monitors the region on the right side of the own vehicle. Therefore, in the situation illustrated in FIG. 9, the priority of the right front sensor 21 is 3/2, the priority of the right rear sensor 22 is 1, the priority of the left front sensor 23 is 2, and the priority of the left rear sensor 24 is 2. Note that the priority of the right front sensor 21 is added in this manner to detect a bicycle, or the like, which approaches the own vehicle from the right side and which is traveling on a pedestrian crossing 50.

The subsequent FIG. 10 illustrates a situation where the own vehicle completes the left turn and is leaving the intersection. In this situation, the operation state of the turn signal lever is still the left indicated state. Therefore, in S105 described above, 1 is added to the priorities of both the right front sensor 21 and the right rear sensor 22. Meanwhile, because the angle X formed by the oncoming lane and the direction of the own vehicle is 270 degrees, in S109 described above, a calculation result of $\{(270-180)/90=1\}$ is added to the priority of the right front sensor 21 which monitors the region on the right side of the own vehicle. Therefore, in the situation illustrated in FIG. 10, the priority of the right front sensor 21 is 2, the priority of the right rear sensor 22 is 1, the priority of the left front sensor 23 is 2, and the priority of the left rear sensor 24 is 2.

1-4. Effects

According to the first embodiment which has been described in detail above, the following effects can be obtained.

(1a) In the present embodiment, the control apparatus 9 specifies the angle X formed by the direction of the oncoming lane and the direction of the own vehicle. The control apparatus 9 then sets the priorities of the plurality of sensors 21 to 24 in accordance with the specified angle X. The control apparatus 9 then changes the ratios of the processing amounts for the plurality of output values output from the plurality of sensors 21 to 24 on the basis of the set priorities.

In this manner, in the present embodiment, it is possible to change the priority in accordance with the angle X. Therefore, it is possible to appropriately set the priority in accordance with the angle X. That is, in the case where the own vehicle makes a turn at the intersection, or the like, it is possible to appropriately set the priority. It is therefore possible to suppress occurrence of delay of detection of a mobile body due to the priorities of the sensors being inappropriately set.

(1b) In the present embodiment, the processing period for the output value of the sensor is changed shorter as the priority is higher. Therefore, the processing amount per unit time for the output value output by the sensor is changed to be larger, specifically, a processing frequency is changed to be higher as the priority is higher. Therefore, the output value of the sensor with higher priority is processed at a higher necessary processing frequency, while the output value of the sensor with lower priority is processed at a lower processing frequency which puts less load on the CPU 91 and the in-vehicle LAN. Therefore, in the case where the plurality of sensors 21 to 24 are used, it is possible to appropriately monitor regions around the own vehicle while reducing load on the CPU 91 and the in-vehicle LAN compared to a configuration where the output values of all the sensors 21 to 24 are processed at a high frequency.

Further, because the load on the CPU is reduced in this manner, it is possible to use a CPU with less computing power. It is therefore possible to suppress cost of the CPU. Further, it is possible to save space by reducing a size of a chip, or the like, provided at the CPU.

(1c) In the present embodiment, in the case where the angle X is smaller than 180 degrees, that is, in the case where the direction of the own vehicle deviates (turns) to the right side with respect to the direction of the oncoming lane, the priority of the left front sensor 23 is increased. Meanwhile, in the case where the angle X is larger than 180 degrees, that is, in the case where the direction of the own vehicle deviates (turns) to the left side with respect to the direction of the oncoming lane, the priority of the right front sensor 21 is increased.

Therefore, in the case where the own vehicle makes a turn, the priorities of the sensors 21 and 23 which monitor the regions on the opposite side of the traveling direction of the own vehicle is increased. Therefore, compared to a configuration where the priorities of only the sensors which monitor the regions on the traveling direction side of the own vehicle is increased, it is possible to make it easier to detect a mobile body such as an oncoming vehicle which approaches the own vehicle from the opposite side of the traveling direction of the own vehicle.

(1d) In the present embodiment, the direction of the oncoming lane is set as the reference direction. It is therefore possible to improve detection accuracy of the oncoming vehicle, a bicycle, or the like, which travels on a pedestrian crossing parallel to the oncoming lane. That is, the direction of the oncoming lane reflects the traveling direction of the oncoming vehicle and the traveling direction of a bicycle, or the like, which travels on a pedestrian crossing parallel to the oncoming lane. Therefore, in the present embodiment, the priority is set in accordance with these traveling directions. That is, the priority appropriate for detecting the oncoming vehicle, a bicycle, or the like, is set. It is therefore possible to improve detection accuracy of the oncoming vehicle, a bicycle, or the like, which travels on a pedestrian crossing parallel to the oncoming lane.

(1e) In the present embodiment, the angle X is specified on the basis of the current location of the own vehicle and the map data. For example, in the case where the direction of the oncoming lane is detected using a camera, there is a case where the oncoming lane is not detected when there exists an obstacle such as a vehicle, or when the own vehicle travels at night. In contrast to this, according to the configuration of the present embodiment, even when there exists an obstacle such as a vehicle or when the own vehicle travels at night, it is possible to detect the direction of the oncoming lane. It is therefore possible to detect the reference direction more stably.

Note that, in the present embodiment, the control apparatus 9 corresponds to the sensor control apparatus, the sensors 21 to 24 correspond to the plurality of sensors, the left front sensor 23 corresponds to the left sensor, the right front sensor 21 corresponds to the right sensor, and the angle X corresponds to the direction of the vehicle specified by the specifying unit. Further, S108 and S109 correspond to the processing as the setting unit, S110 corresponds to the processing as the executing unit, S201 corresponds to the processing as the location acquiring unit, S202 corresponds to the processing as the map data acquiring unit, and S204 corresponds to the processing as the specifying unit.

2. Second Embodiment

2-1. Differences from First Embodiment

Because the second embodiment is similar to the first embodiment in basic configuration, description regarding common configurations will be omitted, and differences will be mainly described. Note that reference numerals which are the same as those in the first embodiment indicate the same components, and previous description will be referred to.

In the first embodiment described above, the direction of the own vehicle with respect to the reference direction is specified using the current location of the own vehicle and the map data. In contrast to this, the second embodiment is different from the first embodiment in that the direction of the own vehicle with respect to the reference direction is specified using a captured image of the camera 3.

The sensor control system 1 in the second embodiment has a hardware configuration similar to that in the first embodiment. Meanwhile, processing to be executed by the control apparatus 9 in the second embodiment is partially different from that in the first embodiment. Specifically, the second embodiment is different from the first embodiment only in the angle specifying processing to be executed in S106 in FIG. 3 described above.

2-2. Processing

Figure 11:
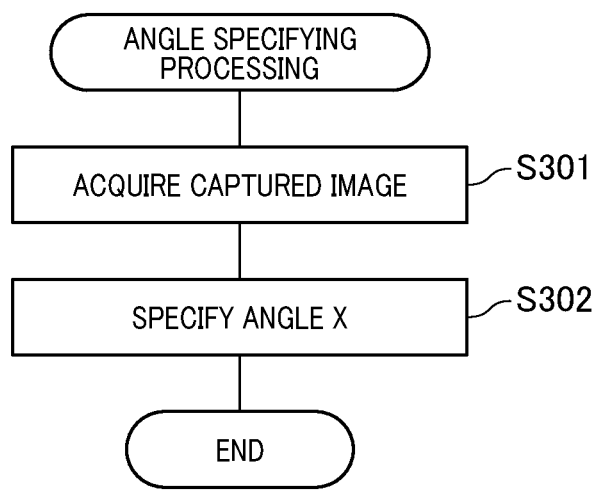
FIG. 11 is a flowchart of angle specifying processing of a second embodiment.

Angle specifying processing in the second embodiment will be described next using a flowchart in FIG. 11.

In S301, the control apparatus 9 acquires a captured image ahead the own vehicle from the camera 3.

In S302, the control apparatus 9 specifies the angle X formed by the reference direction and the direction of the own vehicle on the basis of the acquired captured image. Specifically, the control apparatus 9 performs image processing on the acquired captured image to detect an oncoming lane. Then, the control apparatus 9 sets a direction of the detected oncoming lane as the reference direction. Further, the direction of the oncoming lane is detected as a relative bearing with respect to the own vehicle in the captured image. Therefore, by the direction of the detected oncoming lane being set as the reference direction, the angle X formed by the reference direction and the direction of the own vehicle is specified.

After the control apparatus 9 executes S302, the control apparatus 9 finishes the angle specifying processing.

2-3. Effects

According to the second embodiment described in detail above, in addition to the effects (1a) to (1d) of the first embodiment described above, the following effects can be obtained.

In the present embodiment, the control apparatus 9 specifies the angle X on the basis of the captured image. Therefore, for example, it is possible to specify the angle X with less error than a configuration where the angle X is specified using the GPS receiver 4 as in the first embodiment.

Note that, in the present embodiment, S301 corresponds to the processing as the image acquiring unit, and S302 corresponds to the processing as the specifying unit.

3. Third Embodiment 3-1. Differences from First Embodiment

Because the third embodiment is similar to the first embodiment in basic configuration, description regarding common configurations will be omitted, and differences will be mainly described. Note that the reference numerals which are the same as those in the first embodiment indicate the same components, and previous description will be referred to.

In the first embodiment described above, the direction of the own vehicle with respect to the reference direction is specified using the current location of the own vehicle and the map data. In contrast to this, the third embodiment is different from the first embodiment in that the direction of the own vehicle with respect to the reference direction is specified using the operation state of the turn signal lever of the own vehicle and a steering angle of the own vehicle.

The sensor control system 1 in the third embodiment has a hardware configuration similar to that in the first embodiment. Meanwhile, processing to be executed by the control apparatus 9 in the third embodiment is partially different from that in the first embodiment. Specifically, the third embodiment is different from the first embodiment only in the angle specifying processing to be executed in S106 in FIG. 3 described above.

3-2. Processing

Figure 12:
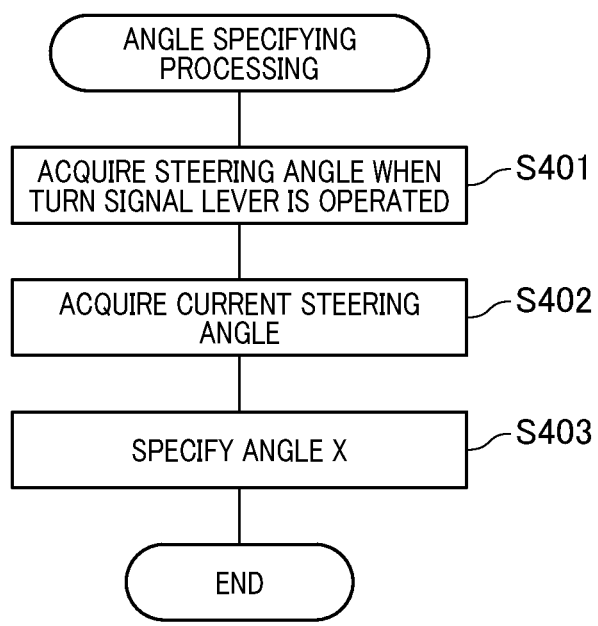
FIG. 12 is a flowchart of angle specifying processing of a third embodiment.

The angle specifying processing in the third embodiment will be described next using a flowchart in FIG. 12.

In S401, the control apparatus 9 acquires a steering angle when the turn signal lever is operated. In the present embodiment, the steering angle when the turn signal lever of the own vehicle is operated most recently so that the operating state becomes the right indicated state or the left indicated state from the straight indicated state is stored in the storage apparatus 5. The control apparatus 9 acquires the steering angle from the storage apparatus 5. Note that, while, in the present embodiment, the steering angle at a time point at which the turn signal lever is operated is stored in the storage apparatus 5, the stored steering angle is not limited to this. The steering angle at a time point somewhat before or after the time point at which the turn signal lever is operated may be stored.

In S402, the control apparatus 9 acquires a current steering angle from the steering angle sensor 7.

In S403, the control apparatus 9 specifies the angle X on the basis of the acquired current steering angle and the steering angle when the turn signal lever is operated. In S403, first, an amount of change between the acquired current steering angle and the steering angle when the turn signal lever is operated is calculated. In other words, an amount of change of the steering angle until the present time based on the steering angle when the turn signal lever is operated is calculated. The control apparatus 9 then specifies an amount of change of the direction of the own vehicle in accordance with the calculated amount of change as the angle X.

That is, in the present embodiment, it is inferred that, when the turn signal lever is operated, the own vehicle is traveling along the reference direction. This is because, when the turn signal lever is operated, the own vehicle is traveling on the own lane before, for example, the intersection, and it can be considered that the direction of the own lane matches the direction of the oncoming lane, that is, the reference direction. Then, it is inferred that the amount of change of the steering angle from the time point at which the turn signal lever is operated corresponds to the angle X.

After the control apparatus 9 executes S403, the control apparatus 9 finishes the angle specifying processing.

3-3. Effects

According to the third embodiment described in detail above, in addition to the effects (1a) to (1d) in the first embodiment described above, the following effects can be obtained.

In the present embodiment, the control apparatus 9 specifies the angle X on the basis of the amount of change between the steering angle when the turn signal lever is operated and the current steering angle. It is therefore possible to specify the angle X with a simple configuration.

Note that, in the present embodiment, S401 corresponds to the processing as the first steering angle acquiring unit, S402 corresponds to the processing as the second steering angle acquiring unit, and S403 corresponds to the processing as the specifying unit.

4. Other Embodiments

While the embodiments for implementing the present disclosure have been described above, the present disclosure is not limited to the above-described embodiments, and may be implemented with various modifications.

Figure 13:
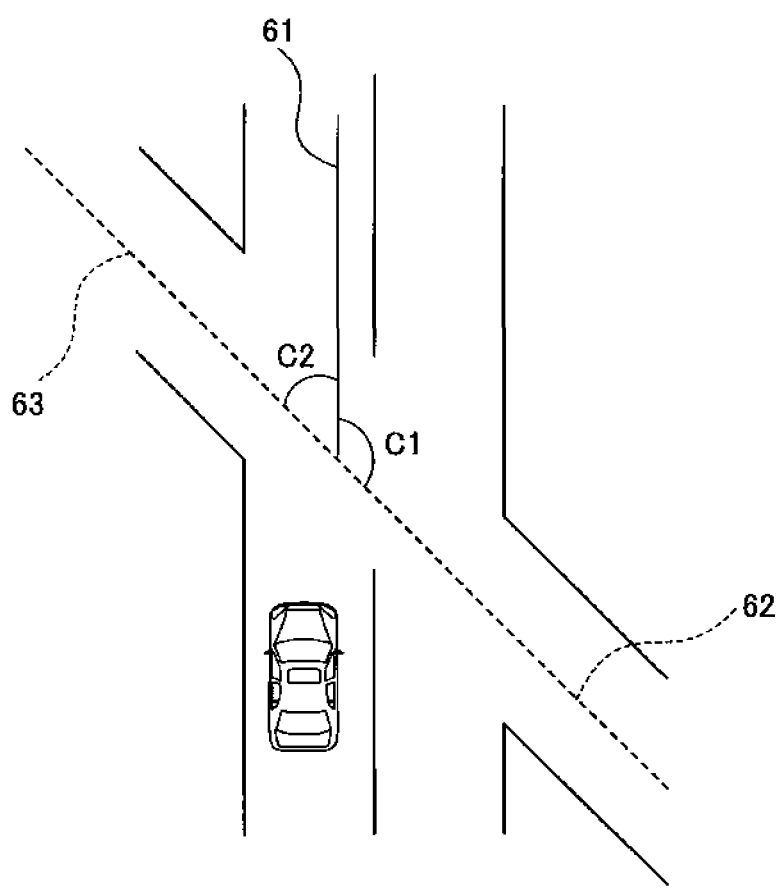
FIG. 13 is a diagram (part 1) illustrating an example of the intersection where roads are not orthogonal to each other.
Figure 14:
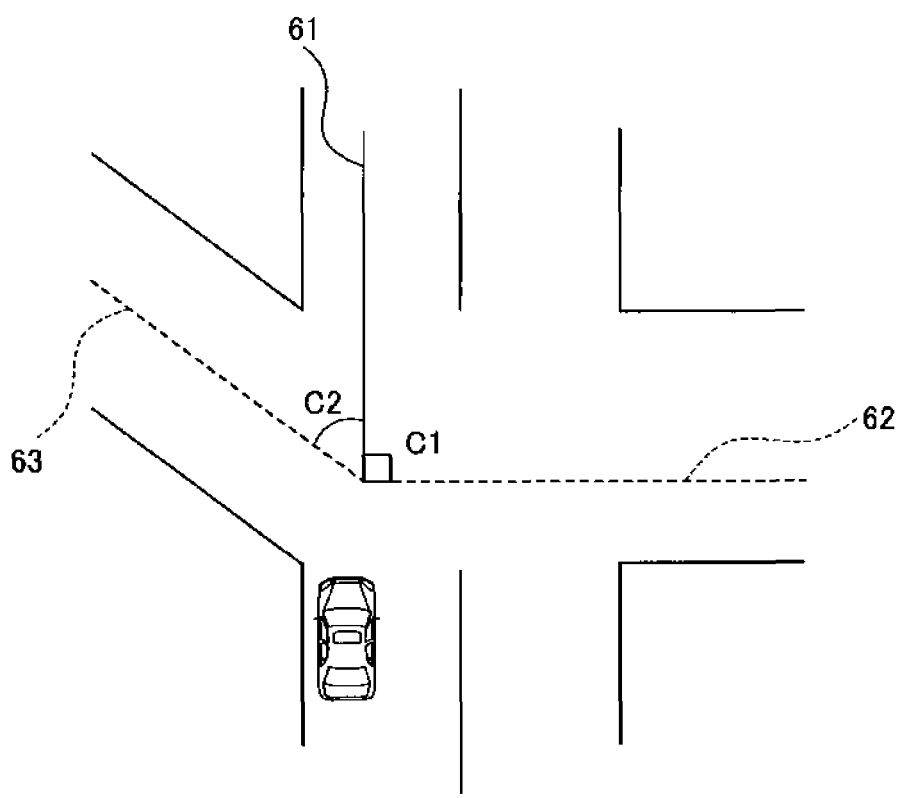
FIG. 14 is a diagram (part 2) illustrating an example of the intersection where roads are not orthogonal to each other.

(4a) While, in the above-described respective embodiments, the sensor control processing assuming that roads are orthogonal to each other at the intersection has been described as an example, the sensor control processing is not limited to this. For example, typical sensor control processing including an intersection at which two roads are not orthogonal to each other, that is, including an intersection at which at least one of an angle C1 and an angle C2 is not 90 degrees, as illustrated in FIG. 13 and FIG. 14 may be executed. The angle C1 described here is an angle formed by a direction of a road on which the own vehicle travels immediately before the own vehicle enters the intersection and a direction of a road which intersects with the intersection from the right side. Further, the angle C2 described here is an angle formed by the direction of the road on which the own vehicle travels immediately before the own vehicle enters the intersection and a direction of a road which intersects with the intersection from the left side.

Note that, in FIG. 13 and FIG. 14, a solid line 61 indicates the direction of the road on which the own vehicle travels immediately before the own vehicle enters the intersection. Further, a dashed line 62 indicates the direction of the road which intersects with the intersection from the right side. Further, a dashed line 63 indicates the direction of the road which intersects with the intersection from the left side.

Figure 15:
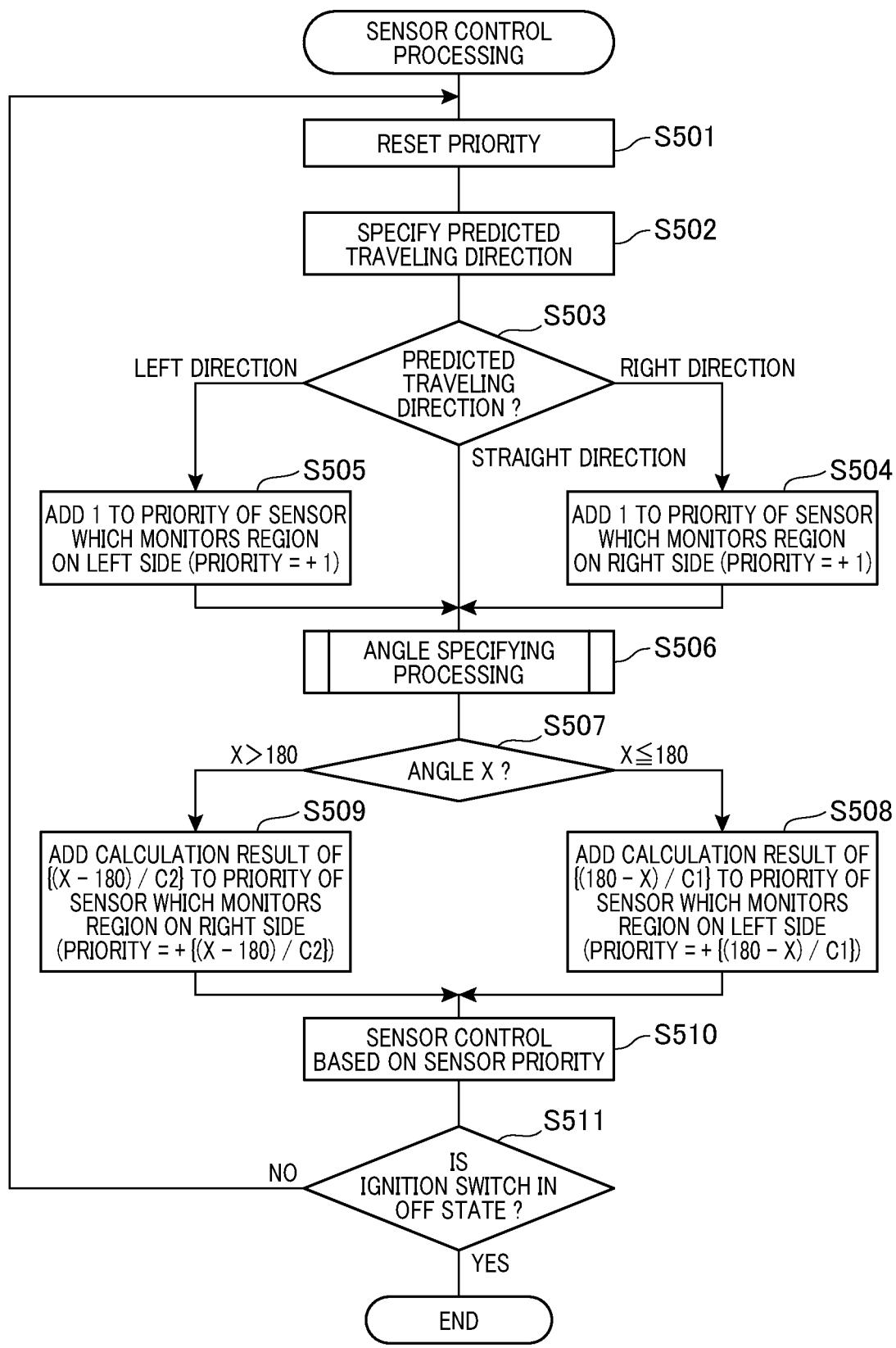
FIG. 15 is a flowchart of typical sensor control processing also including the intersection where roads are not orthogonal to each other.

Specifically, the control apparatus 9 may execute sensor control processing in FIG. 15 which will be described below.

Figure 3:
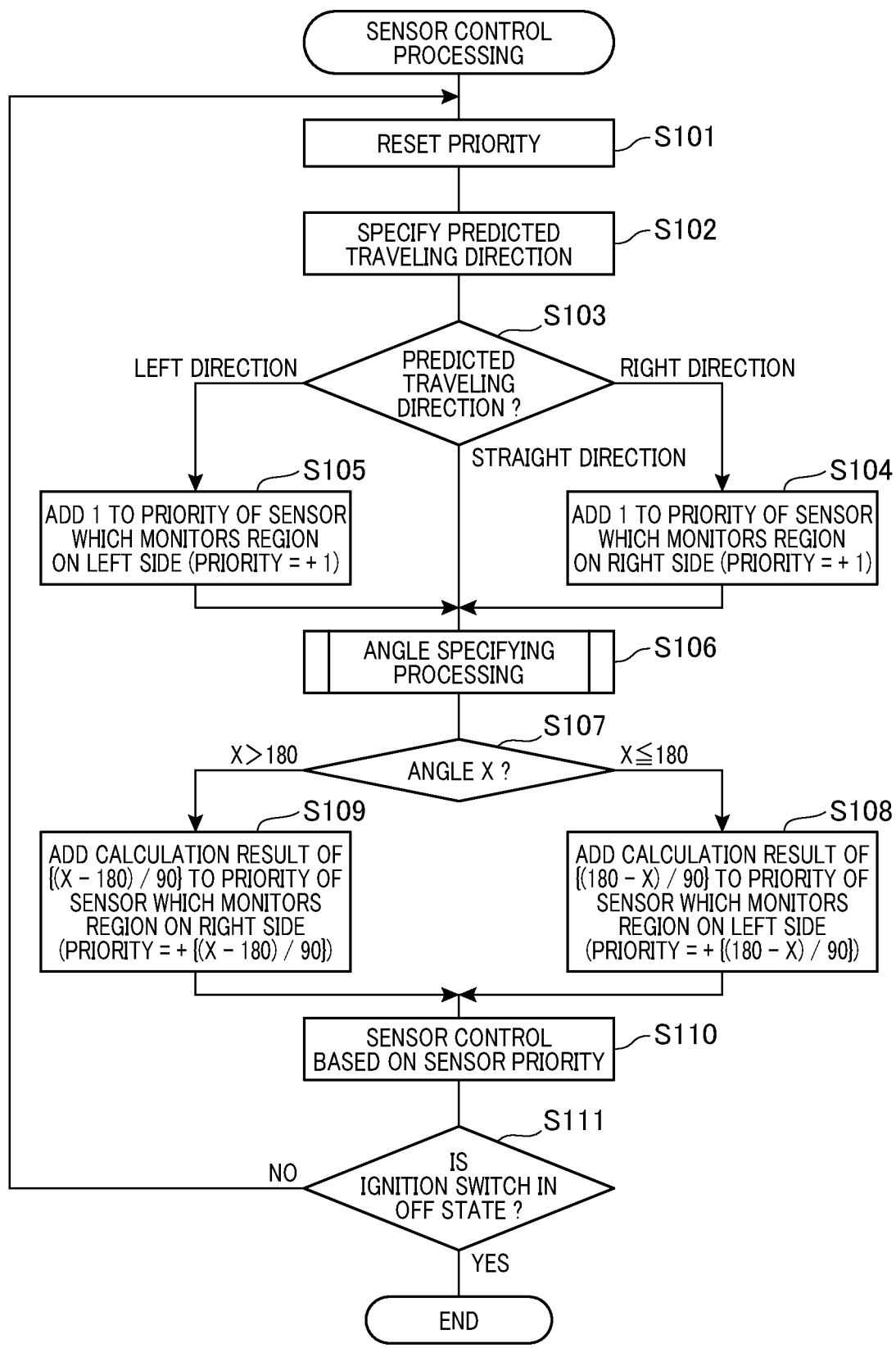
FIG. 3 is a flowchart of sensor control processing.

Because S501 to S507 are respectively similar to S101 to S107 in FIG. 3 described above, description thereof will be omitted.

In the case where the control apparatus 9 determines that the angle X is equal to or smaller than 180 degrees in S507, the processing proceeds to S508.

In S508, the control apparatus 9 adds a calculation result of $\{(180-X)/C1\}$ to the priority of the left front sensor 23 which monitors the region on the left side of the own vehicle. After the control apparatus 9 executes S508, the processing proceeds to S510.

Meanwhile, in the case where the control apparatus 9 determines that the angle X is larger than 180 degrees in S507, the processing proceeds to S509.

In S509, the control apparatus 9 adds a calculation result of $\{(X-180)/C2\}$ to the priority of the right front sensor 21 which monitors the region on the right side of the own vehicle. After the control apparatus 9 executes S509, the processing proceeds to S510.

Because S510 and S511 are respectively similar to S110 and S111 in FIG. 3 described above, description thereof will be omitted.

Note that, in the present embodiment, S508 and S509 correspond to the processing as the setting unit, and S510 corresponds to the processing as the executing unit.

(4b) While, in the above-described respective embodiments, the sensors 21 to 24 are millimeter-wave radars, a type of the sensors is not limited to this. The sensors may be, for example, laser radars, image sensors such as cameras, or the like.

(4c) While, in the above-described respective embodiments, the right front sensor 21, or the like, which monitors the region on the right front side of the vehicle is mounted on the vehicle, the sensor mounted on the vehicle is not limited to this. For example, a right sensor which monitors the region on the right side of the vehicle, a left sensor which monitors the region on the left side of the vehicle, or the like, may be mounted on the vehicle.

(4d) While, in the above-described respective embodiments, the predicted traveling direction is specified on the basis of a detection result of the turn signal sensor 8, a method for specifying the predicted traveling direction is not limited to this. The predicted traveling direction may be specified on the basis of, for example, a line of sight of a driver, or the like. Further, for example, the predicted traveling direction may be specified by the location of the own vehicle on the road being estimated. Specifically, for example, in the case where it is determined using the camera 3, the GPS receiver 4 and the storage apparatus 5 that the own vehicle is located on a right turn lane or a left turn lane, the predicted traveling direction may be specified as the right direction or the left direction.

(4e) The timing for switching the reference direction at the intersection is not limited to those in the above-described respective embodiments. For example, the reference direction may be switched in the case where section lines, or the like, of a road on which the own vehicle travels immediately after the own vehicle leaves the intersection are detected by the camera 3. Further, for example, the reference direction may be switched in the case where the own vehicle passes through a certain point such as a pedestrian crossing on the road on which the own vehicle travels immediately after the own vehicle leaves the intersection, using the location of the own vehicle by the GPS receiver 4, or the like.

(4f) While, in the above-described respective embodiments, the direction of the oncoming lane is set as the reference direction, the direction set as the reference direction is not limited to this. For example, the direction of the own lane may be set as the reference direction. Further, for example, the direction of the pedestrian crossing 50 parallel to the own lane or the oncoming lane, illustrated in FIG. 8 to FIG. 10 may be set as the reference direction. Here, "parallel" is not limited to parallel in a strict sense, and does not have to be strictly parallel as long as the intended effects can be provided. Also in the case where the direction of the own lane or the pedestrian crossing 50 parallel to the own lane or the oncoming lane is set as the reference direction in this manner, an effect similar to the effect (1d) in the first embodiment described above can be obtained.

(4g) While, in the above-described respective embodiments, the processing amounts for the output values of the respective sensors 21 to 24 are changed by the processing periods for the output values of the respective sensors 21 to 24 being changed, a configuration for changing the processing amounts in a predetermined time period is not limited to this. For example, it is also possible to change the processing amounts in the predetermined time period by changing the processing amounts of one time while maintaining a fixed processing period.

(4h) While, in the above-described respective embodiments, the ratios of the processing amounts for the output values of the sensors 21 to 24 are changed on the basis of the priorities, control based on the priorities is not limited to this. For example, ratios of operating performance of the plurality of sensors 21 to 24 may be changed on the basis of the priorities. Specifically, for example, detection accuracy of the sensors 21 to 24 may be changed as the operating performance. In this case, the operation of the sensors 21 to 24 may be controlled so that the detection accuracy of the sensor becomes higher as the priority is higher. According to such a configuration, the detection accuracy of the sensor is changed to be higher as the priority is higher. Therefore, the sensor with higher priority performs monitoring with higher necessary detection accuracy, while the sensor with lower priority performs monitoring with lower detection accuracy which puts less load on the CPU 91 and the in-vehicle LAN. Therefore, in the case where the plurality of sensors 21 to 24 are used, it is possible to appropriately monitor regions around the own vehicle while reducing load on the CPU 91 and the in-vehicle LAN compared to a configuration where all the sensors 21 to 24 perform monitoring with high detection accuracy.

Note that control of changing the detection accuracy of the sensors is, for example, the following control. That is, for example, at an FMCW radar, beat signals generated from transmission/reception waves are subjected to fast Fourier transform (FFT), and a signal component which is a peak is extracted from the processing result. Then, a distance, or the like, from a target which reflects the radar waves is calculated on the basis of the extraction result. As control for changing the detection accuracy of the sensors, there is control in which a reference of extraction when peaks which can be candidates for various kinds of targets are extracted from the processing result of FFT is changed.

Further, for example, as control for changing the detection accuracy of the sensors, there are control in which a frequency range in which peak search is to be performed is changed, control in which frequency resolution of FFT is changed, or the like.

(4i) In the above-described respective embodiments, part or all of the functions executed by the control apparatus 9 may be configured with hardware by one or a plurality of ICs, or the like.

(4j) The present disclosure can be realized in various forms including, in addition to the control apparatus 9 described above, the sensor control system 1 in which the control apparatus 9 is a component, a program for causing a computer to function as the control apparatus 9, a non-transitory computer-readable storage medium such as a semiconductor memory in which this program is stored, a method for setting priority in accordance with the direction of the vehicle with respect to the reference direction, or the like.

(4k) A plurality of functions provided at one component in the above-described respective embodiments may be realized with a plurality of components, or one function provided at one component may be realized with a plurality of components. Further, a plurality of functions provided at a plurality of components may be realized with one component, or one function realized with a plurality of components may be realized with one component. Further, part of the configurations of the above-described respective embodiments may be omitted. Still further, at least part of the configuration in the above-described each embodiment may be added or replaced from the configuration in the other above-described embodiment. Note that any aspect included in technical idea specified by the wording recited in the claims is an embodiment of the present disclosure.

The invention claimed is:
1. A sensor control apparatus comprising:
an executing unit configured to execute at least one of control of operating performance of a plurality of sensors which monitor different regions around a vehicle and predetermined processing for each of a plurality of output values output from the plurality of sensors;
a specifying unit configured to specify a degree of inclination of a direction of the vehicle with respect to a reference direction set on a basis of a road around the vehicle;
a first adjustment unit configured to adjust priorities of the plurality of sensors in accordance with a predicted traveling direction of the vehicle; and
a second adjustment unit configured to adjust the priorities of the plurality of sensors in accordance with the degree of the inclination specified by the specifying unit, during a period from a time when a change of a traveling direction of the vehicle is initiated to a time when the change is terminated,
wherein,
the plurality of sensors include a left sensor which is a sensor capable of monitoring a region on a left side of the vehicle, and a right sensor which is a sensor capable of monitoring a region on a right side of the vehicle;
the first adjustment unit increases priority of the right sensor in a case where the predicted traveling direction is a right direction, and increases priority of the left sensor in a case where the predicted traveling direction is a left direction;
the second adjustment unit increases the priority of the left sensor with increasing the degree of the inclination in a case where the direction of the vehicle deviates to a right side with respect to the reference direction, and increases the priority of the right sensor with increasing the degree of the inclination in a case where the direction of the vehicle deviates to a left side with respect to the reference direction; and
the executing unit changes at least one of ratios of the operating performance of the plurality of sensors and ratios of amounts of processing performed for the plurality of output values on a basis of the priorities adjusted by the first and the second adjustment units,
wherein changing the ratios of the amounts of processing performed for the plurality of output values changes a processing frequency of the sensor that has the higher priority such that an output value of the sensor that has the higher priority is processed at a higher processing frequency relative to an output value of a sensor that has a lower priority, such that approaching objects from the side opposite of the side in which the vehicle deviates are detectable when the vehicle deviates from the reference direction, and
wherein changing the ratios of the operating performance of the plurality of sensors changes a detection accuracy of a sensor that has a higher priority such that the sensor that has the higher priority is controlled so that the detection accuracy of the senior increases as the priority increases, such that approaching objects from a side opposite of the side in which the vehicle deviates are detectable when the vehicle deviates from the reference direction.

2. The sensor control apparatus according to claim 1, wherein the operating performance is detection accuracy, and
the executing unit changes detection accuracy of a first sensor among detection accuracy of the plurality of sensors to be higher than detection accuracy of a second sensor with priority lower than priority of the first sensor.

3. The sensor control apparatus according to claim 1, wherein the executing unit increases an amount of processing performed for a first output value among the plurality of output values compared to an amount of processing performed for a second output value output by the sensor with priority lower than priority of the sensor which outputs the first output value.

4. The sensor control apparatus according to claim 1, wherein the specifying unit sets a direction of an own lane, an oncoming lane or a pedestrian crossing parallel to the own lane or the oncoming lane at an intersection as the reference direction.

5. The sensor control apparatus according to claim 1, further comprising:
   a location acquiring unit configured to acquire a current location of the vehicle; and
   a map data acquiring unit configured to acquire map data including road information,
   wherein the specifying unit specifies the degree of the inclination on a basis of the current location and the map data.

6. The sensor control apparatus according to claim 1, further comprising:
   an image acquiring unit configured to acquire a captured image around the vehicle from a camera mounted on the vehicle,
   wherein the specifying unit specifies the degree of the inclination on a basis of the captured image.

7. The sensor control apparatus according to claim 1, further comprising:
   a first steering angle acquiring unit configured to acquire a steering angle of the vehicle when a turn signal lever of the vehicle is operated; and
   a second steering angle acquiring unit configured to acquire a current steering angle of the vehicle,
   wherein the specifying unit specifies the degree of the inclination on a basis of an amount of change between the steering angle when the turn signal lever is operated and the current steering angle.

8. A sensor control apparatus according to claim 1, wherein:
   two right side sensors include a right front sensor and a right rear sensor;
   two left side sensors include a left front sensor and a left rear sensor;
   the first adjustment unit increases priorities of the right front sensor and the right rear sensor in a case where the predicted traveling direction is the right direction, and increases priorities of the left front sensor and the left rear sensor in a case where the predicted traveling direction is the left direction; and
   the second adjustment unit increases the priority of the left front sensor with increasing the degree of the inclination in a case where the direction of the vehicle deviates to the right side with respect to the reference direction, and increases the priority of the right front sensor with increasing the degree of the inclination in a case where the direction of the vehicle deviates to the left side with respect to the reference direction.

* * * * *